United States Patent [19]
Itoh et al.

[11] Patent Number: 5,288,426
[45] Date of Patent: Feb. 22, 1994

[54] NONLINEAR OPTICAL MATERIALS

[75] Inventors: Hiroyuki Itoh; Takafumi Ishii; Takehiro Toyooka, all of Kanagawa; Tetsuo Satoh, Tokyo, all of Japan

[73] Assignee: Nippon Oil Company. Limited, Tokyo, Japan

[21] Appl. No.: 601,026

[22] Filed: Oct. 23, 1990

Related U.S. Application Data
[63] Continuation-in-part of Ser. No. 340,907, Apr. 20, 1989, abandoned.

[30] Foreign Application Priority Data

Apr. 21, 1988 [JP] Japan .................................. 63-96766

[51] Int. Cl.$^5$ ...................... C09K 19/54; C09K 19/52; F21V 9/00; G02F 1/13
[52] U.S. Cl. ............... 252/299.5; 252/299.01; 252/582; 359/104; 359/328
[58] Field of Search ............. 252/299.01, 299.5, 299.6, 252/299.65, 299.66, 582, 583, 586, 589; 359/328, 104, 105

[56] References Cited

U.S. PATENT DOCUMENTS

| | | | |
|---|---|---|---|
| 4,738,811 | 4/1988 | Hara et al. ...................... | 252/299.01 |
| 4,744,918 | 5/1988 | Heppke et al. ................. | 252/299.61 |
| 4,828,758 | 5/1989 | Gillberg-LaForce et al. ..... | 252/582 |
| 5,081,221 | 1/1992 | Watanabe ........................ | 252/299.01 |

FOREIGN PATENT DOCUMENTS

| | | | |
|---|---|---|---|
| 244288 | 11/1987 | European Pat. Off. ........ | 252/299.01 |
| 62-238538 | 10/1987 | Japan ............................... | 252/299.5 |

OTHER PUBLICATIONS

Meredith, et al., "Optical and Nonlinear Optical Characterization of Molecularly Doped Thermotropic Liquid Crystalline Polymers," *Macromolecules*, 15, 1385-89 (1982).
Chemical Abstracts vol. 98, 1983, p. 19 abstract No. 98: 161429k, Chiral liquid crystal polymers.
Meredith, G. R. et al Macromolecules 15, 1385, 1982.

*Primary Examiner*—Philip Tucker
*Attorney, Agent, or Firm*—Scully, Scott, Murphy & Presser

[57] ABSTRACT

A nonlinear optical material having a high nonlinear optical constant useful for frequency doubler of laser beam which comprises a chiral smectic C liquid crystalline polyester consisting essentially of the structural units having the general formulae (A), (B) and (C);

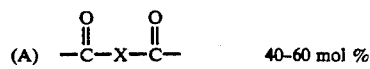

Wherein X is a structural unit selected from the group consisting of (Abstract continued on next page.)

ABSTRACT
-continued
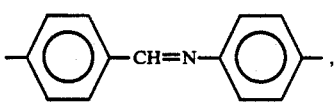,
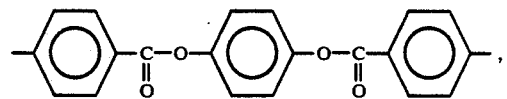,
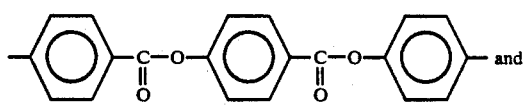 and
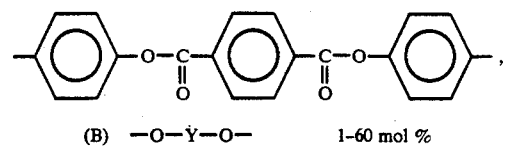,
(B) —O—Y—O—   1-60 mol %
Wherein Y is a group having at least one optically active carbon and the total carbon number of Y is 3-12.
(C) 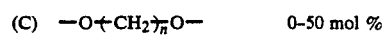   0-50 mol %
wherein n is an integer of 2-10.
16 Claims, 2 Drawing Sheets

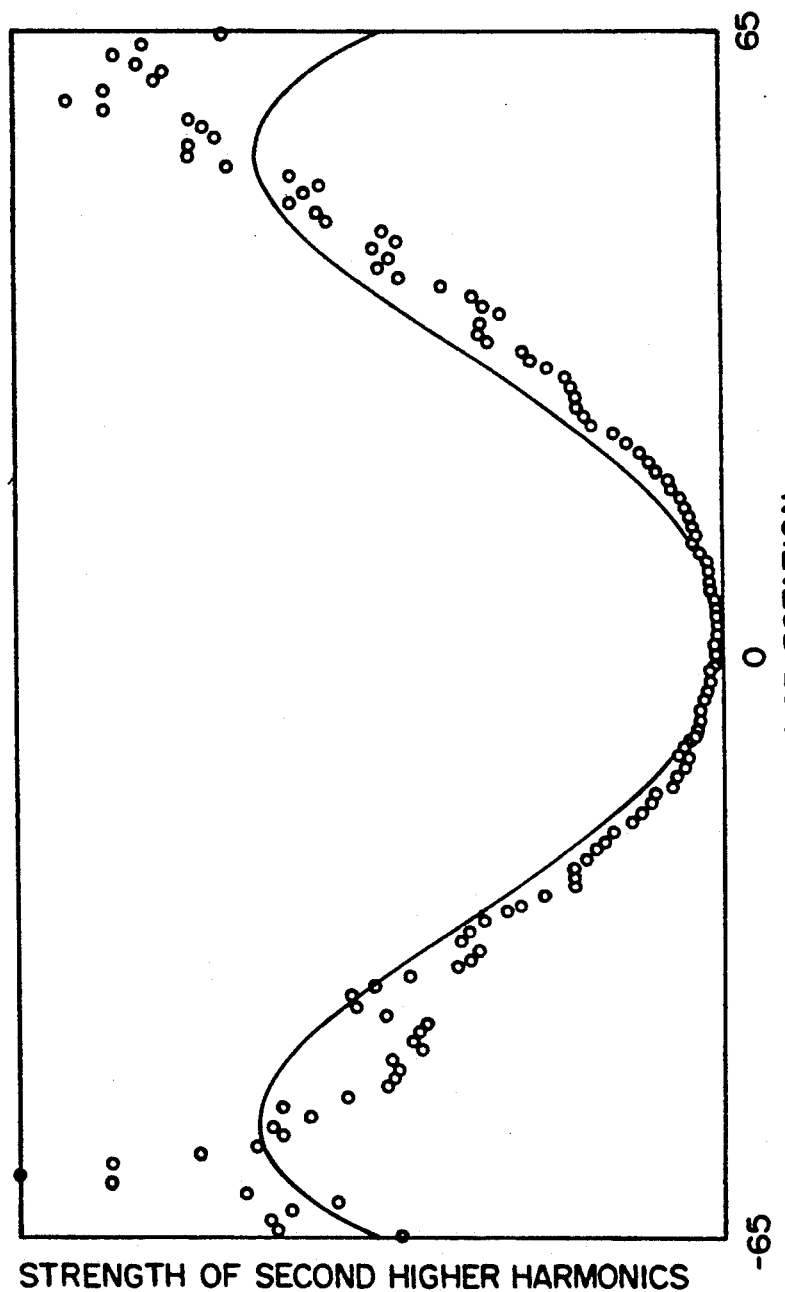

NONLINEAR OPTICAL MATERIALS

This application is continuation-in-part, of application Ser. No. 340,907, filed on Apr. 20, 1989 now abandoned.

BACKGROUND OF THE INVENTION

The present invention relates to nonlinear optical materials having a high nonlinear optical constant useful for doubling the frequency of a laser beam and the like.

Nonlinear optical materials have actively been investigated as the important technology for optoelectronics in such applications as laser beam frequency doublers, optical modulators, optical switches and optical computers. Well known nonlinear optical materials include lithium niobate, potassium dihydrogen phosphate and the like. Unlike these inorganic materials, no crystals of organic materials have been developed which have a macroscopic second order hyperpolarizability large enough for practical use, although the ones available possess superior characteristics such as a nonlinear optical constant 100–1000 times higher, response at a higher speed and stronger resistance to optical damages than the inorganic materials. In many cases, even when the constructing molecule itself has a large secondary molecular susceptibility, the macroscopic second order hyperpolarizability will be zero in the crystalline state due to its inversion symmetry with the result that there will be no optical secondary harmonic generation (SHG). As stated above, it is difficult to produce single crystals with no center of symmetry by the use of a low-molecular organic substance alone. Therefore, methods have been proposed in which such organic molecules are dispersed in a matrix of a macromolecular compound and the host macromolecules are oriented by the aid of an external field, such as an electric field, simultaneously allowing for unsymmetric orientation of the guest organic molecules. For example, SHG is observed by blending 4-dimethylamino-4'-nitrostilbene (DANS) in a nematic liquid crystalline macromolecules and then applying an electric field to the blend to cause orientation [G. R. Meredith, Macromolecules, 15(5), 1385(1982)]. In this method, however, as the DANS can be blended in a concentration of 2% maximum and the orientating force of the host macromolecular liquid crystals is not satisfactorily high, there is produced an unsatisfactory nonlinear optical constant several times as high as that of urea. Japanese Patent Laid-open No. 238538/1987 also describes an observation of an SHG of 0.53 μm by incidence of $Nd^{3+}$/YAG laser beam upon a film prepared from a composition of DANS dispersed in thermotropic macromolecular liquid crystals of main chain type. Also, EP No. 244288 describes the synthesis of a liquid crystalline polymer of side-chain type in which a mesogen and a unit exerting nonlinear optical response have been linked to the side chain of a polymer, such as polyacrylate, polymethacrylate or polysiloxane, and the orientation of a film of the polymer by applying an electric field followed by incidence of $Nd^{3+}$/YAG laser beam by which an SHG of 0.53 μm is observed. The methods described in these publications are commonly characterized by the use of a matrix polymer which is the nematic liquid crystalline polymer of a substance inherently having a symmetrical center since a unit exerting a nonlinear response is orientated asymmetrically and consequently has a critical disadvantage in that a material having a nonlinear optical constant sufficiently high for practical use cannot be produced by these methods.

Another disadvantage of the method of using a nematic liquid crystalline polymer is that the use of a nematic liquid crystalline polymer produces no benefit in the phase matching which is technologically important for practical use, and utilization of conventional birefrigence or optical waveguide is necessary.

SUMMARY OF THE INVENTION

It is an object of the invention to overcome the critical disadvantage of the prior art for producing nonlinear optical materials by utilizing the orientation field of nematic liquid crystalline polymers. The inventors have found that novel nonlinear optical materials having a very large nonlinear optical constant and easily undergoing phase matching can be obtained by utilizing the asymmetrical orientation field of chiral smectic liquid crystalline polymer. The present invention is based upon the above finding.

The present invention resides in nonlinear optical materials comprising a chiral smectic C liquid crystalline polyester consisting essentially of the structural units having the general formulae (A), (B) and (C);

(A)  $-\overset{O}{\overset{\|}{C}}-X-\overset{O}{\overset{\|}{C}}-$      40-60 mol % wherein X is a structural unit selected from the group consisting of

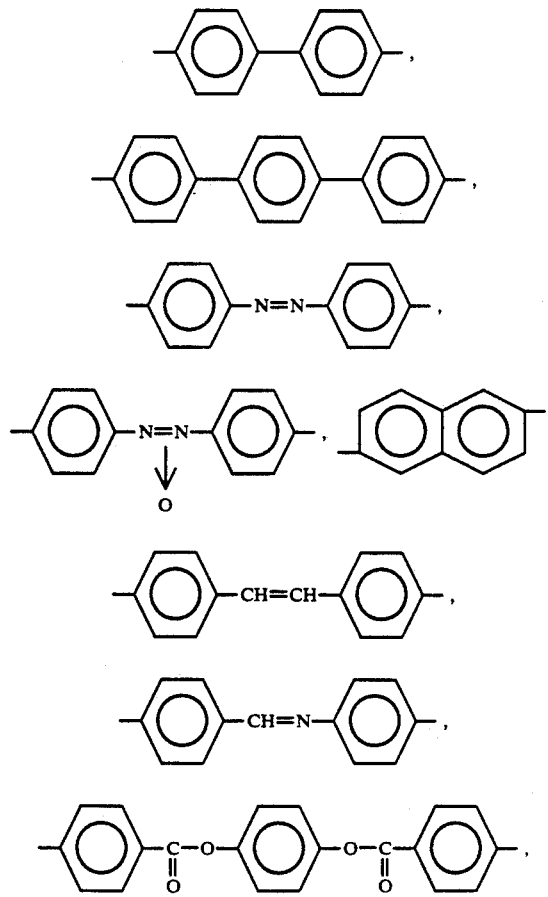

-continued

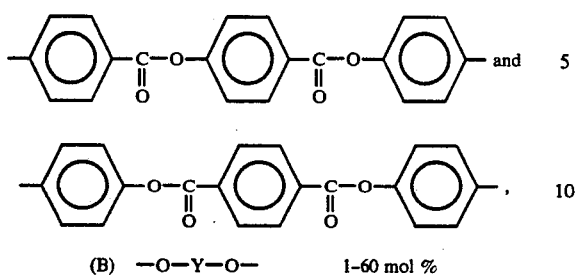
and (B) —O—Y—O—    1-60 mol % wherein Y is a group having at least one optically active carbon and the total carbon number of Y is 3-12.

(C) —O—(CH$_2$)$_n$—O—    0-50 mol % wherein n is an integer of 2-10, and optionally a compound exerting a nonlinear optical response.

DETAILED DESCRIPTION OF THE INVENTION

The present invention will be described in detail hereinafter.

The structural unit(A) having the general formula

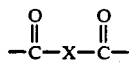

is a unit acting as a mesogen. X is a structural unit selected from the group consisting of

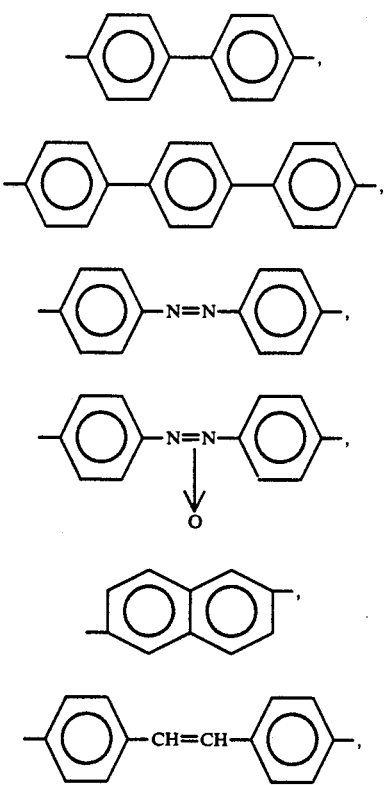

-continued

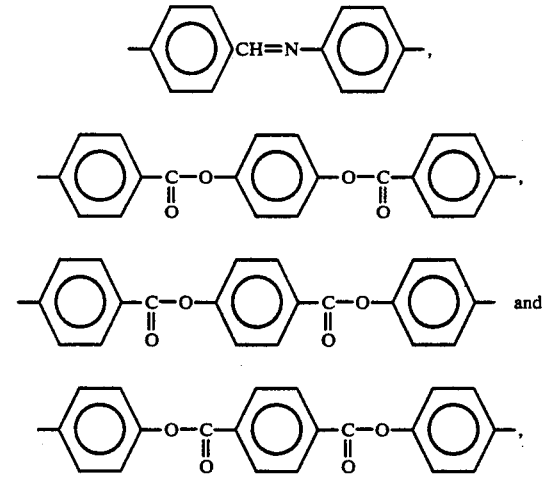
and and preferably a structural unit selected from the group consisting of

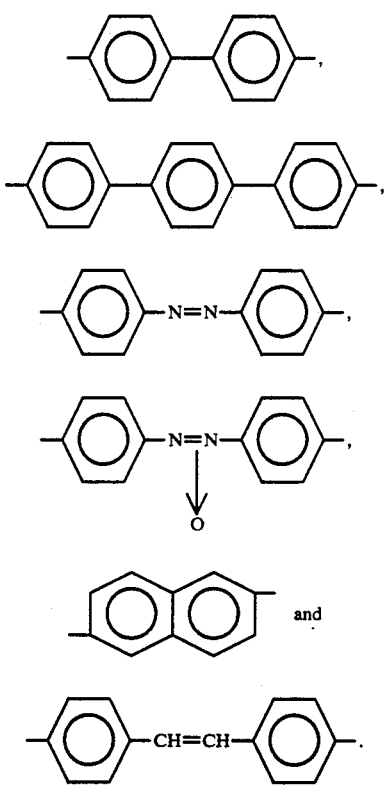

The structural unit (A) is usually derived from a dicarboxylic acid of HOOC—X—COOH or a derivative thereof such as dialkyl ester (e.g., diethyl ester). The structural unit (A) is present in a proportion of 40-00 mol %, preferably 45-55 mol % and most preferably about 50 mol % in the polymer.

The structural unit (B) having the general formula —O—Y—O is a unit which is an optically active component whereby the polyester of the invention exhibits a chiral smectic C liquid crystalline phase. Y is a group having carbon number 3-12, at least one of which is optically active. Examples of Y unit include

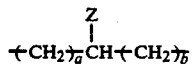

wherein a and b are each an integer of 0-10, the sum of a and b is in the range of 2-11, a does not equal to b, and Z is selected from the group consisting of $C_{1-3}$ alkyl, F, Cl and Br. Preferable examples of Y are

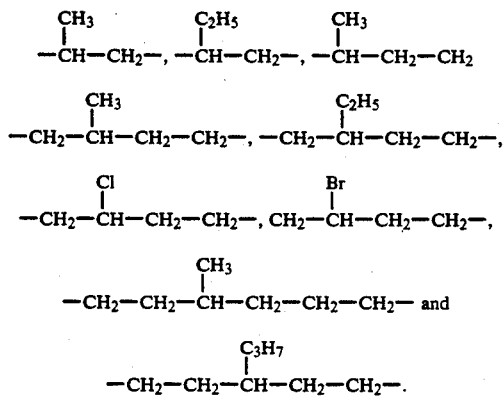

The unit (B) is derived from a corresponding diol or a derivative thereof such as diacetylated compound. There may be used either R or the S isomer, or a mixture thereof. When the mixture is used, the difference in content between the R and the S isomers should be greater than 1%, preferably greater than 10%, most preferably greater than 20%. When the difference is smaller than 1%, the temperature range for forming a chiral smectic C phase is too narrow. The structural unit (B) is present in a proportion of 1-60 mol %, preferably 10-50 mol %. When the structural unit is present in a proportion smaller than 1%, the temperature range for forming a chiral smectic C phase is too narrow.

The structural unit (C) having the formula $-O-(CH_2)-_nO$ is a component for controlling such conditions as transition temperature, temperature range and viscosity when the polyester is forming a chiral smectic C phase. The number of n and the amount may be selected depending upon the properties of the desired polymer. The structural unit (C) is present in a proportion of 0-50 mol %. The preferable amount is 5-40 mol % the control of physical properties. In the formula, n is an integer of 2-10, preferably 4-8. When n is 1 or larger than 10, there are some cases where no liquid crystal is formed. The structural unit (C) is derived from a corresponding $\alpha$, $\omega$-diol or a derivative thereof such as diacetylated derivative.

The chiral smectic C liquid crystalline polyester of the invention can be prepared by a known melt-polymerization or solution polymerization process. It goes without saying that the ratio of the amounts of the monomers is selected so that the total of the acid components is almost equimolar to that of the diol components. For example, predetermined amount of biphenyl-4,4' dicarboxylic acid diethyl ester, an optically active 2-alkyl-1,4-butane diol and an $\alpha$, $\omega$-alkanediol may be reacted at a high temperature and under high vacuum to yield a polyester. The molecular weight may be adjusted by controlling the polymerization time. In order to accelerate the polymerization there may be used a known catalyst, such as alkali metal salts or metallic salts of Fe, Mn, Cd, Mg, Ba, Ti, Zn, Pb, Co, Sb, and Sn alone or in combination. A phosphorus compound may also be added as decomposition inhibitors.

In the nonlinear optical materials of the invention, the chiral smectic C liquid crystalline polyesters have no symmetrical center therein and therefore exert a nonlinear optical response by themselves. However, it is preferable to use them in combination with other compounds exerting a nonlinear optical response in order to produce more efficient nonlinear optical materials.

The compounds exerting a nonlinear optical response (referred to as NLO) and which are used in combination with the subject polyesters are those having a secondary molecular susceptibility larger than $1 \times 10^{-30}$ esu, preferably larger than $10 \times 10^{-30}$ esu, since the larger the secondary molecular susceptibility, the better. Generally, polarization $\mu$ which occurs in an organic compound is expressed as $\mu = \alpha E + \beta E \cdot E + \gamma E \cdot E \cdot E + \ldots$ In the equation E is an outer electric field and $\alpha$, $\beta$, $\gamma$ ... are respectively primary, secondary, tertiary ... molecular susceptibilities. In the above discussion, the secondary molecular susceptibility means the value $\beta$ in the above equation.

As the preferable NLO compounds, employed in combination with the subject polyesters, are mentioned urea derivatives, enone derivatives, nitroaniline derivatives, a variety of heterocyclic compounds, stilbene derivatives, etc.

As examples of the urea and enone derivatives are mentioned

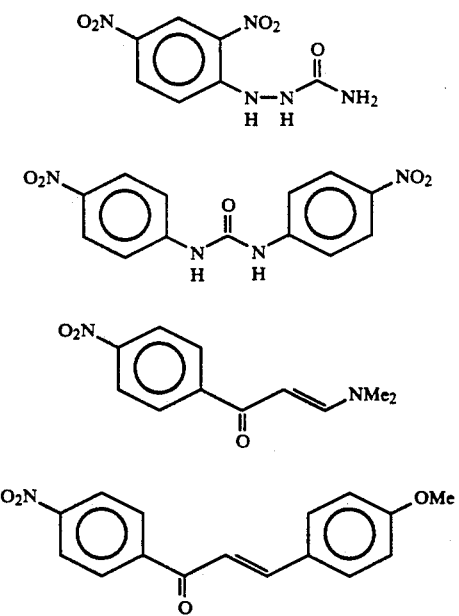

As the nitroaniline derivatives are mentioned

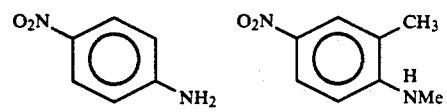

-continued

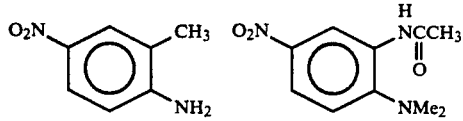

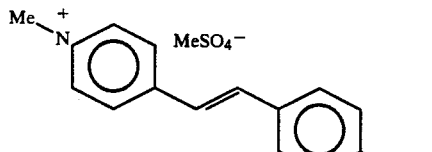

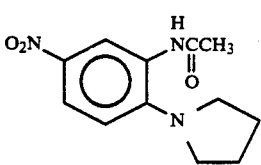

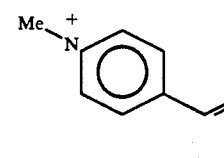

and the like. As examples of the heterocyclic compound are mentioned

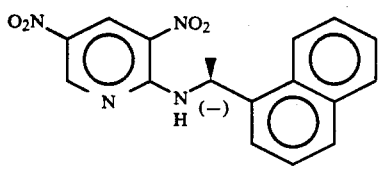

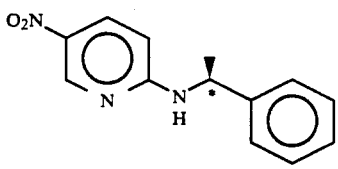

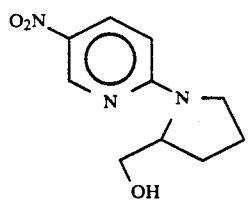

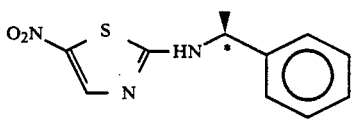

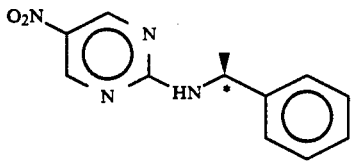

As examples of the stilbene derivative are mentioned

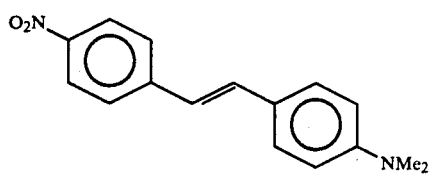

Whereas these compounds are examples of the compound that can be used in the invention, it is known that compounds with the conjugated $\pi$ electron system and being highly polarized have a large secondary molecular susceptibility, and any compound, even if not illustrated above, may be used in the invention provided that it has a secondary molecular susceptibility larger than $1 \times 10^{-30}$ esu.

It is preferred that the NLO compound is combined with the subject polyester in the range of 1 to 50%, most preferably 5 to 30% by weight of the chiral smectic C liquid crystalline polyester.

If content of the NLO compound is less than 1% by weight, conversion efficiency of the incident light to the secondary harmonics will be too small to be practicable, and if it is more than 50% by weight, the amount of the guest compound relative to the host polymer will be too large to yield orientation sufficient to give a practicable nonlinear optical response.

Methods for preparing the nonlinear optical materials of the invention will be described below. The materials of the invention may be in various forms such as sheet, film and thin film when used as a nonlinear optical component.

A chiral smectic C liquid crystalline polyester and a NLO compound are homogeneously dissolved in a common solvent and the solvent is evaporated to obtain a homogeneous composition. The common solvent is not particularly limited so far as the both components can be homogeneously dissolved therein. Adequate solvent is variable depending upon the nature of the NLO compound, the of the polymer and the of the combination of the two components. Particular illustrative examples include halogen-based solvents, such as dichloroethane, tetrachloroethane, trichloroethylene, tetrachloroethylene and orthodichlorobenzene, phenolic solvents such as phenol, pentachlorophenol and pentafluorophenol, polar solvents such as tetrahydrofuran dimethylformamide, dimethylacetamide and N-methylpyrrolidone and the like. After evaporation of the solvent the composition is heated and maintained in a molten state. The temperature of the molten composition is variable depending upon nature of the composition, but usually in the range of 50° to 300° C., preferably 70° to 250° C.

After the composition is maintained in a temperature range in which it is in the chiral smectic C phase, usually for 1 minute to 20 hours, a shearing force is applied to the composition to orient the molecules in parallel with the film surface. Then the sufficiently oriented chiral smectic C phase is fixed by cooling. The polyester used in the invention is in the cholesteric or smectic phase at a temperature range higher than that in which it is in the chiral smectic C phase. The composition is kept in a temperature range in which it is in the cholesteric phase or smectic A phase. Then the temperature is lowered somewhat to age it in the chiral smectic C phase, a shearing force is applied to the composition to orientate the molecule in parallel with the film surface and it is cooled to fix the sufficiently oriented chiral smectic C phase. The cooling rate varies depending on the temperature range for chiral smectic C phase; that is, the cooling rate varies depending on the optically active component content. However, since the temperature range in which the polyester of the invention is in the chiral smectic C phase is quite wide, the chiral smectic C liquid crystal structure can be easily fixed by permitting the film surface to cool to a temperature lower than the transition temperature of the chiral smectic C phase without requiring any special operation.

The easy fixation is one of the great characteristic features of the invention.

The materials produced by fixing the chiral smectic C liquid crystal phase containing a NLO compound in accordance with the process of the invention as mentioned above can be used as nonlinear optical materials without any additional treatment. In other words, since the chiral smectic C liquid crystal has no symmetrical center therein unlike nematic liquid crystals, the NLO compound oriented in the asymmetric orientation field of the chiral smectic C liquid crystal also has an asymmetrically oriented structure and as a result, the produced material exerts a nonlinear optical response. As mentioned above, it is one of the outstanding characteristic features of the invention that asymmetric orientation of an NLO compound can be achieved only by the orienting force of a host polymer and a nonlinear optical material can be produced without aid of external force such as an electric field. Of course, the satisfactory asymmetrically oriented structure can also be realized by the use of an electric field. For example, a nonlinear optical material having a fixed asymmetrically oriented structure can be obtained by heating a composition consisting essentially of a chiral smectic C liquid crystalline polyester and a NLO compound inserted between two transparent electrodes and applying an electric field while maintaining the composition at a temperature exhibiting a chiral smectic C phase to produce asymmetric orientation in the polymer and the NLO compound followed by cooling from the temperature to fix the asymmetrically oriented structure.

Another outstanding characteristic feature of the invention is a nonlinear optical material which is easily phase-matched. The chiral smectic C liquid crystal, unlike a nematic liquid crystal, is characterized by a helical structure. Unique phase matching is feasible by the use of a periodic field and anisotropy to circularly polarized light different from conventional methods using birefrigence or optical wave guide.

The nonlinear optical materials according to the invention can realize an excellent asymmetric orientation characteristic since essentially asymmetrical chiral smectic C liquid crystalline polyesters are used as the base, and as a result high nonlinear susceptibility can be obtained.

The nonlinear optical materials of the invention are applicable to a variety of optoelectronics such as wavelength conversion of a laser beam, optical modulation, optical switching and optical computer.

The following examples will further illustrate the invention.

Example 1

(1) Polymer A

Using 5.96 g of diethyl biphenyl-4,4'-dicarboxylate, 1.66 g of (S)-2-methyl-1,4-butanediol, 1.89 g of (enantiotropic excess, e.e.=92%) 1,6-hexanediol and two drops of tetrabutoxy titanium, the reaction was carried out at 185° C. for 45 minutes, at 205° C. for 10 minutes, at 225° C. for 10 minutes and further at 250° C. for 20 minutes, and then at 250° C. for an hours under higher vacuum of 0.3 mmHg to synthesize polymer A of the following structure.

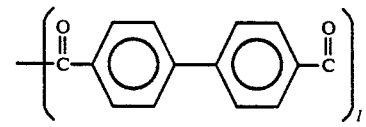

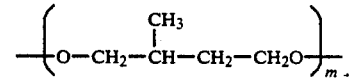

(z:m:n = 50:25:25)

From the results of X-ray diffraction of the polymer A, it was found that a diffraction pattern representing the existence of smectic layer structure was observed, the spacing d at that time decreased along with the lowering of the temperature, and a tilt angle θ of the molecule forming the smectic layer increased together with the lowering of the temperature inversely. Based on these findings, it was also found that the polymer had smectic layer structure, an orientation vector of the molecule forming the smectic layer was tilted and there was correlation between the increase of the tilt angle and the decrease of the spacing among the layers. Thus, the polymer clearly formed a smectic C liquid crystal.

By the observation of the polymer A at 170° C. using a polarization microscope, a clear retardation line was observed and it was found that the polymer A has a helical period structure. Therefore, the polymer is considered to form a smectic C structure and have a helical structure which was observed optically from the results of X-ray diffraction and those of polarization microscope observation, so that it is chiral smectic C liquid crystallinity.

(2) Polymer A+NLO compound

Polymer A as host molecule and p-nitroaniline as NLO compound were dissolved in phenol/tetrachloroethane mixed solvent (weight ratio 60/40) in a ratio of 90% to 10% to prepare a homogeneous solution. Then, the solvent was evaporated from this solution to produce a cast film. This cast film was sandwiched between two polyimide films coated with tefron, interposing with a spacer of aluminum film of 100 μm, and preheated at 170° C. for 30 minutes using a bench press. Then while maintaining the same temperature, pressing was carried out with slowly increasing pressure, and the sandwiched material were taken out of the press and allowed to be cooled. After removing the polyimide film and the aluminum spacer, $Nd^{3+}$/YAG laser light (λ=1.06 μm) was radiated on the resulting film to examine a nonlinear optical response of the film, so that the generation of the second higher harmonic (λ=0.53 μm) was observed.

Other films were prepared repeating the above method except that the temperature was changed to 165° C., 175° C. and 180° C., and 4 samples including the above film treated at 170° C. were determined to the strength of the second higher harmonics and were found to have different values. This means that the helical pitch of the chiral smectic C liquid crystal varies depending on the temperature and the matching of phase takes place.

Example 2

(1) Polymer B

According to Example 1 (1), Using (S)-3-methyl-1,6-hexanediol (e.e.=95%) as an optical active component, polymer B of the following structure was synthesized.

This polymer was found to be chiral smectic C liquid crystallinity from the observation of X-ray diffraction and polarization microscopy.

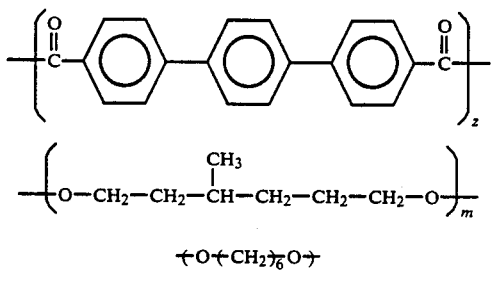

(z:m:n = 52:16:32)

(2) Polymer B+NLO compound

Polymer B as host molecule and 4-dimethylamino-4'-nitrostilbenzene as NLO compound were dissolved in phenol/tetrachloroethane mixed solvent (weight ratio 60/40) in a ratio of 95% to 5% to prepare a homogeneous solution. Then, the solvent was evaporated from this solution to produce a cast film. This cast film was sandwiched between two sheets of glass attached with transparent electrodes, interposing with a spacer of Kapton film of 100 μm, and by heating at 180° C. and extending slowly in molten state, the polymer was closely adhered onto the electrodes. Then, maintaining the temperature at 180° C., 4 kV/cm of direct current electric field was applied to orientate and a sample was obtained after rapid cooling and solidification. $Nd^{3+}$/YAG laser light (λ=1.06 μm) was radiated on the resulting sample to examine a nonlinear optical response of the film, so that the generation of the second higher harmonic (λ=0.53 μm) was observed.

Example 3

(1) Polymer C

According to Example 1 (1), Using (R)-2-chloro-1,4-butanediol (e.e.=81%) as an optical active component, polymer C of the following structure was synthesized.

Polymer C was found to be chiral smectic C liquid crystallinity from the observation of X-ray diffraction and polarization microscopy.

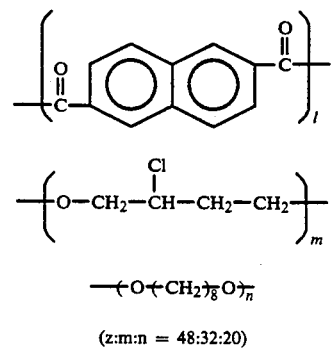

(z:m:n = 48:32:20)

(2) Polymer C+NLO compound

According to Example 1 (1), using Polymer C as host molecule and a compound of the formula;

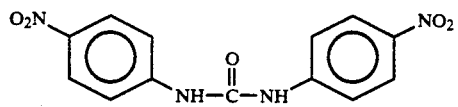

as NLO compound in a ratio of 70% to 30%, a cast film was prepared. Then, this film was finely divided to powder and extruded through a nozzle of a width of 0.5 mm using a T-die extruding molding machine to obtain a film-like material. In order to examine nonlinear optical response of this sample, the determination of the strength of the second higher harmonics was carried out. $Nd^{3+}$/YAG laser light (λ=1.06 μm) was radiated on the resulting sample, so that the generation of the second higher harmonic (λ=0.53 μm) was observed.

Example 4

(1) Polymer D

According to Example 1 (1), Using (S)-3-ethyl-1,9-nonanediol (e.e.=64%) as an optical active component, polymer D of the following structure was synthesized.

Polymer D was found to be chiral smectic C liquid crystallinity from the observation of X-ray diffraction and polarization microscopy.

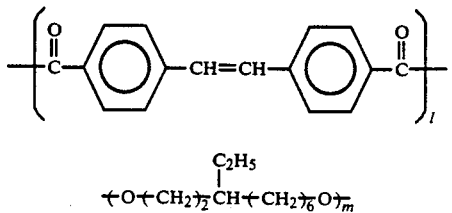

-continued $$+O+CH_2)_4O+_n$$

(z:m:n = 51:20:29)

(2) Polymer D+NLO compound

Polymer D as host molecule and 4-dimethylamino-4'-nitrostilbenzene as NLO compound were dissolved in phenol/-tetrachloroethane mixed solvent (weight ratio 60/40) in a ratio of 90% to 10% to prepare a homogeneous solution. Then, the solvent was evaporated from this solution to produce a cast film. This cast film was sandwiched between two sheets of glass attached with transparent electrodes, interposing with a spacer of Kapton film of 100 μm, and by heating at 200° C. and extending slowly in molten state, the polymer was closely adhered onto the electrodes. Then, maintaining the temperature at 200° C., 4 kV/cm of direct current electric field was applied to orientate and a sample was obtained after rapid cooling and solidification. $Nd^{3+}$/YAG laser light was radiated on the resulting sample to examine a nonlinear optical response of the film, so that the generation of the second higher harmonic (λ=0.53 μm) was observed.

Example 5

(1) Polymer E

According to Example 1 (1), Using (R)-2-bromo-1,5-pentanediol (e.e.=30%) as an optical active component, polymer E of the following structure was synthesized.

Polymer E was found to be chiral smectic C liquid crystallinity from the observation of X-ray diffraction and polarization microscopy.

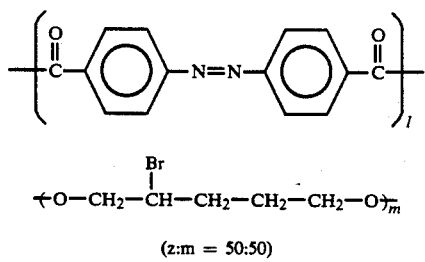

$$+O-CH_2-\overset{Br}{\underset{|}{CH}}-CH_2-CH_2-CH_2-O+_m$$

(z:m = 50:50)

(2) Polymer E+NLO compound

Polymer E as host molecule and N,N-dimethyl-4-nitroaniline as NLO compound were dissolved in phenol/tetrachloroethane mixed solvent (weight ratio 50/50) in a ratio of 80% to 20% to prepare a homogeneous solution. Then, the solvent was evaporated from this solution to produce a cast film. This cast film was sandwiched between two sheets of glass attached with transparent electrodes, interposing with a spacer of Kapton film of 100 μm, and by heating at 180° C. and extending slowly in molten state, the polymer was closely adhered onto the electrodes. Then, maintaining the temperature at 180° C., 4 kV/cm of direct current electric field was applied to orientate and a sample was obtained after rapid cooling and solidification. $Nd^{3+}$/YAG laser light was radiated on the resulting sample to examine a nonlinear optical response of the film, so that the generation of the second higher harmonic (λ=0.53 μm) was observed.

In the following Examples 6-9 the determination of maker fringe was made in the following manner.

Using as a light source of fundamental wave (wave length: 1.064 μm) of a Q-switched Nd-YAG laser, the fundamental wave was applied as S polarized light to a sample as in FIG. 1 and the resulting second higher harmonic having a wave length of 0.532 μm was passed through an analyzer perpendicular to the polarizer, a filter and a monochromator, then detected by a photomultiplier. A maker fringe was obtained by plotting the second higher harmonic relative to the angle of rotation of the sample, then the strength of the maker fringe was compared with that of a maker fringe of quartz as a standard sample, and $\chi^{(2)}zxx$ of the sample was determined by the method of Kurtz et al. (J. Appl. Phys. 41, 1667 (1970)).

Example 6

45 mmol of azobenzene-4,4'-dicarboxylic dichloride was dissolved in 300 ml of dehydrated o-dichlorobenzene. Into the resulting solution was dropwise added a mixture consisting of 35 mmol (S)-3-methyl-1,6-hexanediol, 20 mmol 1,4-butanediol, 100 ml pyridine and 100 ml o-dichlorobenzene, and reaction was allowed to take place at 70° C. for 1 hour. The reaction solution was filtered, then poured into 4 liters of methanol, the polymer prepared was recovered, again dissolved in 500 ml of chloroform, the solution was poured into 4 liters of methanol to purify the polymer, followed by vacuum drying at 80° C. for a whole day and night. From observation using a polarizing microscope and DSC measurement the polymer thus obtained proved to assume a smectic C liquid crystal phase at a temperature of 80° to 95° C. The polymer was dissolved in chloroform and the solution was spin-coated onto a glass base to obtain a thin film, then the liquid crystal structure was fixed by heat treatment at 90° C. for 2 hours and subsequent rapid cooling. The polymer layer was measured for thickness using a tracer type thickness meter, which was found to be 0.8 μm. During the heat treatment the sample was observed through a polarizing microscope to find that it had a spiral-loosened structure.

The sample was determined for $\chi^{(2)}zxx$ by a maker fringe method, which was found to be $8 \times 10^{-9}$ esu. FIG. 2 shows maker fringe data of this sample.

Example 7

58 mmol of p-phenylene bis(4-chlorocarbonyl benzoate) was dissolved in 300 ml of dehydrated o-dichlorobenzene. Into the resulting solution was dropwise added a mixture consisting of 30 mmol (R)-4-ethyl-1, 10-decanediol, 12 mmol ethylene glycol, 100 ml pyridine and 100 ml o-chlorobenzene, and reaction was allowed to take place at 70° C. for 1 hour. The reaction solution was filtered, then poured into 4 liters of methanol, the polymer prepared was recovered, again dissolved in 500 ml of chloroform, the solution was poured into 4 liters of methanol to purify the polymer, followed by vacuum drying at 80° C. for a whole day and night. From observation using a polarizing microscope and DSC measurement the polymer thus obtained proved to assume a smectic C liquid crystal phase at a temperature of 82° to 106° C. The polymer was dissolved in chloroform and the solution was spin-coated onto a glass base to obtain a thin film, then the liquid crystal structure was fixed by heat treatment at 90° C. for 2 hours and subsequent rapid cooling. The polymer layer was measured for thickness using a tracer type thickness meter, which was found to be 1.1 μm. During the heat treatment the sample was observed through a polarizing microscope to find that it had a spiral-loosened structure.

The sample was determined for $\chi^{(2)}zxx$ by the maker fringe method, which was found to be $2 \times 10^{-9}$ esu.

Example 8

40 mmol of silbene-4,4'-dicarboxylic dichloride was dissolved in 300 ml of dehydrated o-dichlorobenzene. Into the resulting solution was dropwise added a mixture consisting of 60 mmol (R)-1,2-propanediol, 100 ml pyridine and 100 ml o-dichlorobenzene, and reaction was allowed to take place at 70° C. for 1 hour. The reaction solution was filtered, then poured into 4 liters of methanol, the polymer prepared was recovered, again dissolved in 500 ml of chloroform, the solution was poured into 4 liters of methanol to purify the polymer, followed by vacuum drying at 80° C. for a whole day and night. From observation using a polarizing microscope and DSC measurement the polymer thus obtained proved to assume a smectic C liquid crystal phase at a temperature of 121° to 143° C. The polymer was dissolved in chloroform and the solution was spin-coated onto a glass base to form a thin film. The film thickness was measured using a tracer type thickness meter and was found to be 1.6 μm. While this sample was heated to 130° C., it was determined for $\chi^{(2)}zxx$ by the maker fringe method, which was found to be $3 \times 10^{-9}$ esu.

Example 9

55 mmol of biphenyl-4,4'-dicarboxylic dichloride was dissolved in 300 ml of dehydrated o-dichlorobenzene. Into the resulting solution was dropwise added a mixture consisting of 2 mmol (S,S)-1,2-butanediol, 43 mmol 1,6-hexanediol, 100 ml pyridine and 100 ml o-dichlorobenzene, and reaction was allowed to take place at 50° C. for 1 hour. The reaction solution was filtered, then poured into 4 liters of methanol, the polymer prepared was recovered, again dissolved in 500 ml of chloroform, the solution was poured into 4 liters of methanol to purify the polymer, followed by vacuum drying at 80° C. for a whole day and night. From observation using a polarizing microscope and DSC measurement the polymer thus obtained proved to assume a smectic C liquid crystal phase at a temperature of 110° to 126° C. The polymer was dissolved in chloroform and the solution was spin-coated onto a glass base to form a thin film, then the liquid crystal structure was fixed by heat treatment at 100° C. for 2 hours and subsequent rapid cooling. The polymer layer was measured for thickness using a tracer type thickness meter, which was found to be 2.2 μm. During the heat treatment the sample was observed through a polarizing microscope to find that an extinction position was present and that the sample had a spiral-loosened structure.

The sample was determined for $\chi^{(2)}zxx$ by the maker fringe method, which was found to be $6 \times 10^{-10}$ esu.

Brief Description of Drawing

FIG. 1 is a drawing showing a polarizing microscope observation used in the Examples and FIG. 2 is a graph showing maker fringe data of Example 6.

Figure 1:
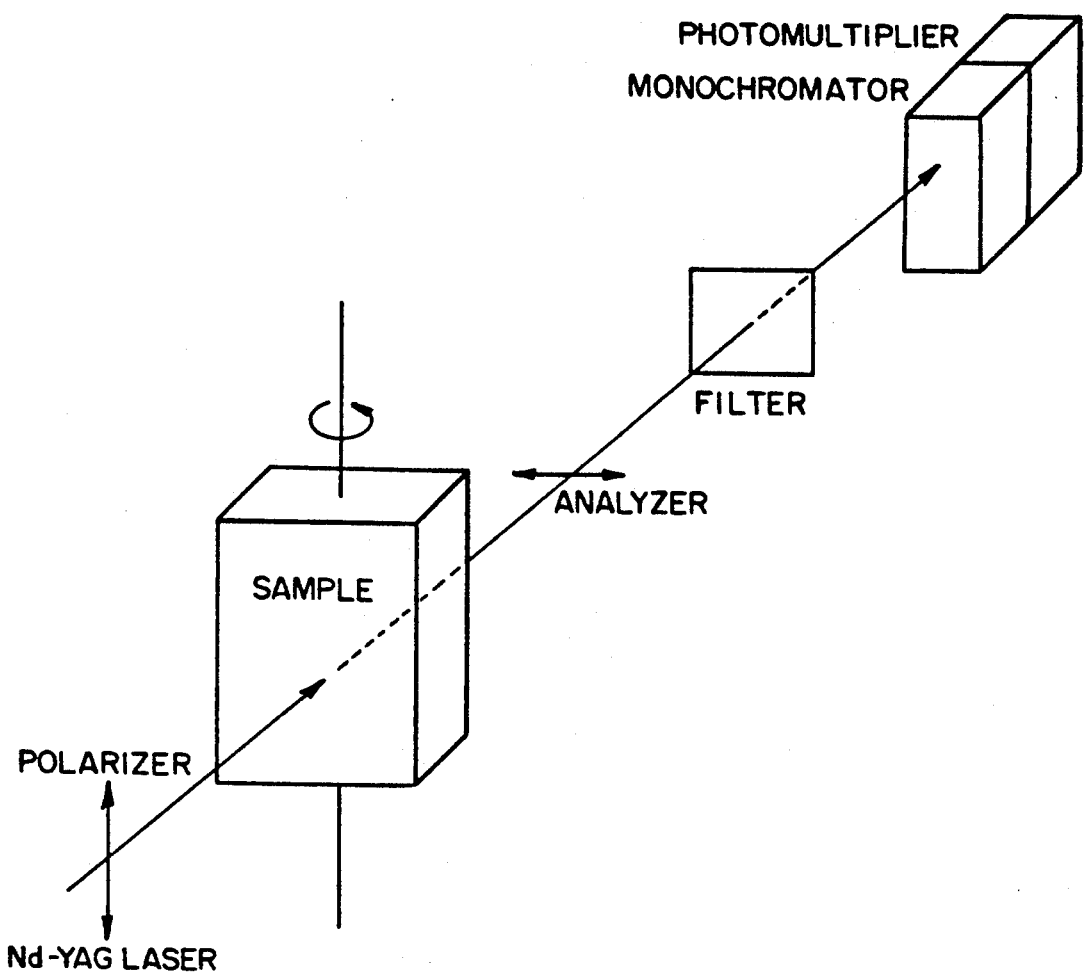

What is claimed is:

1. A nonlinear optical material comprising (a) a compound exhibiting a nonlinear optical response and having a secondary molecular susceptibility larger than $1 \times 10^{-30}$ esu and (b) a chiral smectic C liquid crystalline polyester consisting essentially of the structural units having the general formulae (A), (B) and (C):

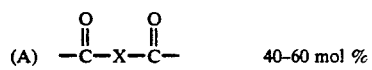

(A)    $-\overset{O}{\underset{\|}{C}}-X-\overset{O}{\underset{\|}{C}}-$    40–60 mol % wherein X is a structural unit selected from the group consisting of

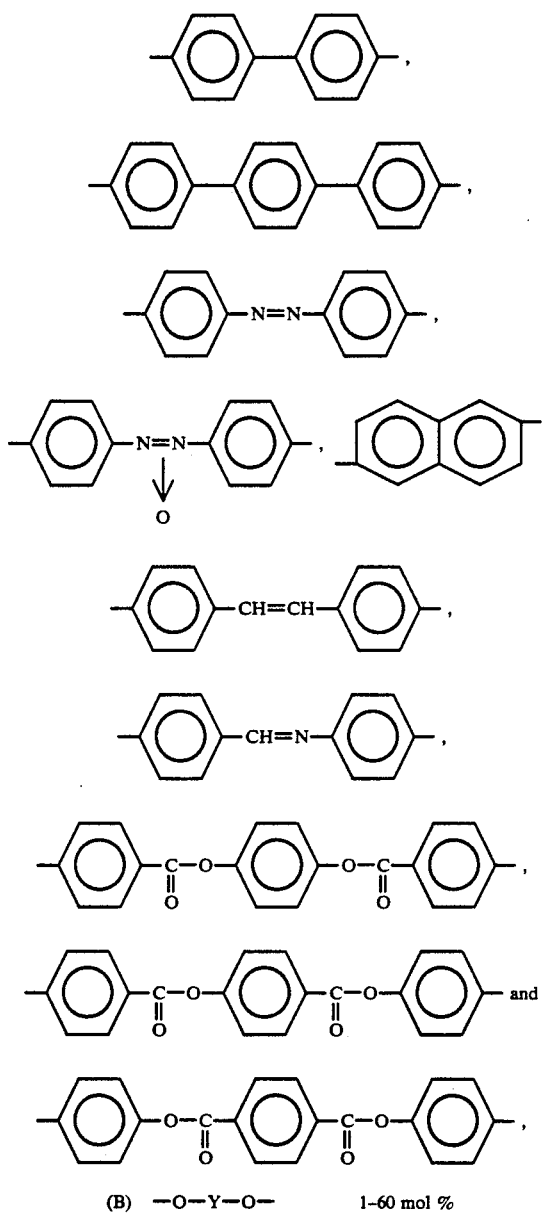

(B)    $-O-Y-O-$    1–60 mol % wherein Y is a structural unit having the general formula

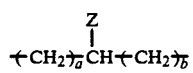

$$-(CH_2)_a-\underset{\underset{Z}{|}}{CH}-(CH_2)_b-$$

wherein a and b are each an integer of 0–10, the sum of a and b is in the range of 2–11, a is not equal to b, and Z is $C_{1-3}$ alkyl, F, Cl or Br and (C) —O⟨CH₂⟩ₙO—  0-50 mol % wherein n is an integer of 2-10.

2. A nonlinear optical material according to claim 1 wherein the structural unit (A) content is 45 to 55 mol %, the structural unit (B) content is 10 to 50 mol % and the structural unit (C) content is 5 to 40 mol %, respectively, based on the polyester.

3. A nonlinear optical material according to claim 1 wherein the difference in amount between the R-isomer and the S-isomer of the structural unit (B) is at least 1%.

4. A nonlinear optical material according to claim 1 wherein the structural unit (A) is a structural unit selected from the group consisting of

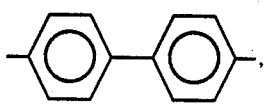

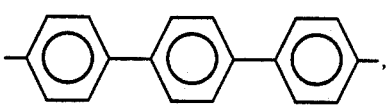

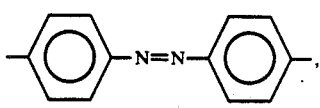

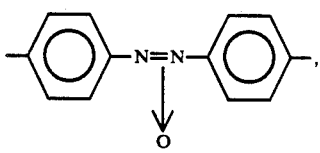

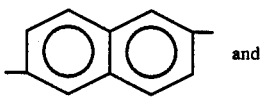

and

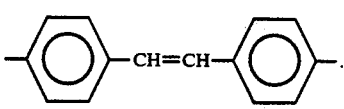

5. A nonlinear optical material according to claim 1 wherein n in the structural unit (C) is an integer of 4 to 8.

6. A nonlinear optical material according to claim 1 wherein the compound is selected from the group consisting of urea derivatives, enone derivatives, nitroaniline derivatives, heterocyclic compounds, stilbene derivatives and merocyanines.

7. The non-linear optical material according to claim 1 wherein the compound has a secondary molecular susceptibility larger than $10 \times 10^{-30}$ esu.

8. The non-linear optical material according to claim 1 wherein the compound contains an urea backbone, in α, β enone backbone, a nitroaniline backbone or stilbene backbone or a nitrogen containing heterocyclic.

9. The non-linear optical material according to claim 6 wherein the urea and enone derivatives are

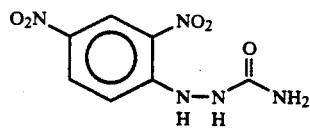

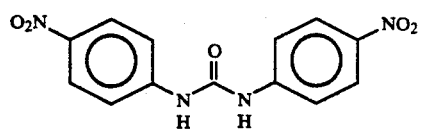

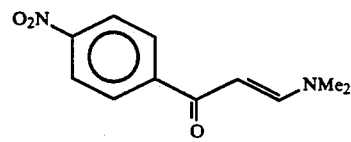

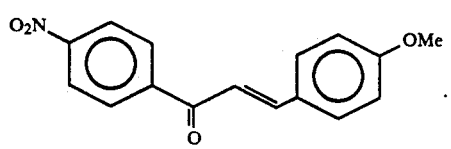

10. The non-linear optical material according to claim 6 wherein the nitro aniline derivatives are

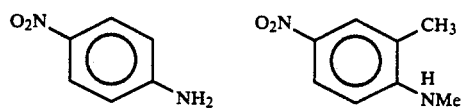

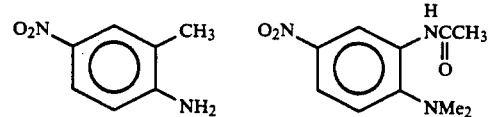

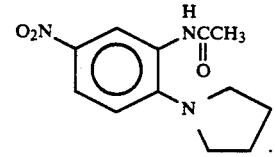

11. The non-linear optical material according to claim 6 wherein the heterocyclic derivatives are

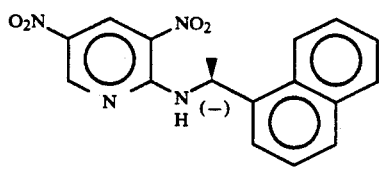

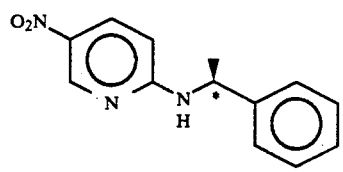

-continued

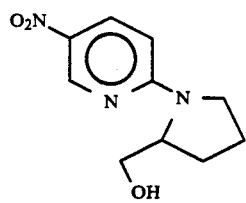

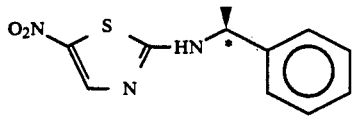

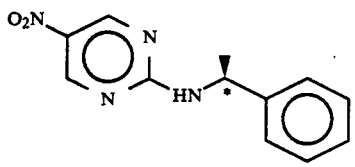

12. The non-linear optical material according to claim 6 wherein the stilbene derivatives are

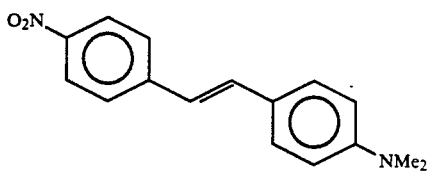

-continued

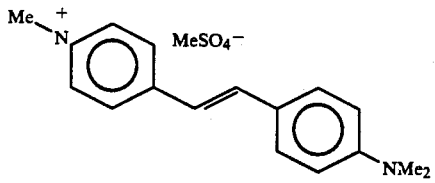

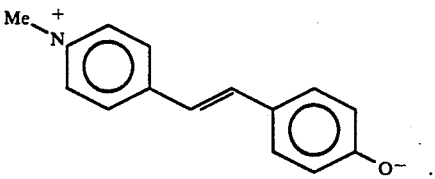

13. The non-linear optical material according to claim 1 wherein the compound is present in the range of 1 to 50%, by weight in the chiral smectic C liquid crystalline polyester.

14. The non-linear optical material according to claim 1 wherein the compound is present in 5 to 30% by weight in the chiral smectic C liquid crystalline polyester.

15. The non-linear optical material according to claim 3 wherein the difference in amount between the R-isomer and the S-isomer of the structural unit (B) is at least 10%.

16. The non-linear optical material according to claim 15 wherein the difference in an amount between the R-isomer and the S-isomer of the structural unit (B) is at least 20%.

* * * * *

UNITED STATES PATENT AND TRADEMARK OFFICE
CERTIFICATE OF CORRECTION

PATENT NO. : 5,288,426
DATED : February 22, 1994
INVENTOR(S) : Hiroyuki Itoh, et al.

It is certified that error appears in the above-indentified patent and that said Letters Patent is hereby corrected as shown below:

On the Title Page, Section [56], Under "FOREIGN PATENT DOCUMENTS", after "252/299.5" insert the following: --0292244  11/1988  European Pat. Off.-- and under Column 4, line 64:  "-O-Y-O"  should read -- -O-Y-O- --

Column 5, line 8:  "does"  should read --is--

Column 5, line 29:  after "either" insert --the--

Column 5, line 41:  " -O-($CH_2$)$-_n$O"  should read -- -O- $(CH_2)$ $-_n$O --

UNITED STATES PATENT AND TRADEMARK OFFICE
CERTIFICATE OF CORRECTION

PATENT NO.   :   5,288,426
DATED        :   February 22, 1994
INVENTOR(S)  :   Hiroyuki Itoh, et al.

It is certified that error appears in the above-indentified patent and that said Letters Patent is hereby corrected as shown below:

Column 5, line 48: after "%" insert --in view of--

Column 8, lines 49-50: "the of the polymer and the of the combination" should read --the nature of the polymer and the nature of the combination--

Column 11, line 12: "material" should read --materials--

Column 17, line 63, Claim 8: "in" should read --an--

Signed and Sealed this

Fourth Day of June, 1996

Attest:

BRUCE LEHMAN

*Attesting Officer*          *Commissioner of Patents and Trademarks*